Nov. 3, 1953 N. NORDSTROM, JR 2,657,691
INSTRUMENT USEFUL IN ANESTHETIZING
BY INTRATRACHEAL INSUFFLATION
Filed Dec. 1, 1952 2 Sheets-Sheet 2
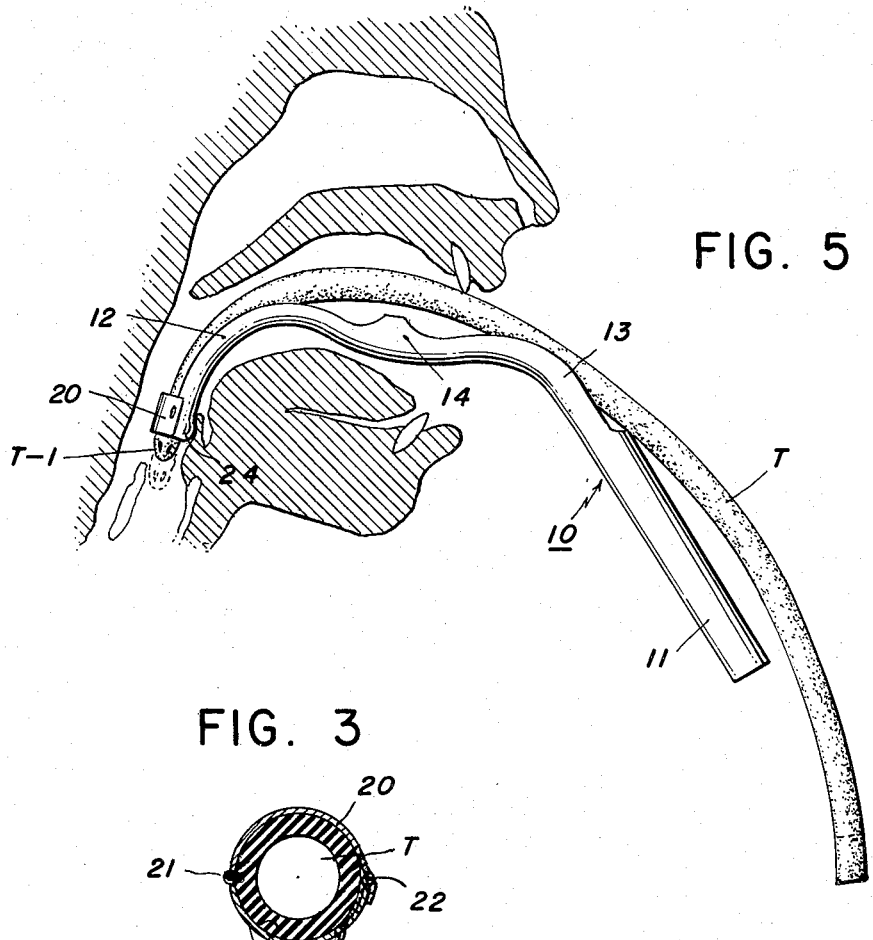
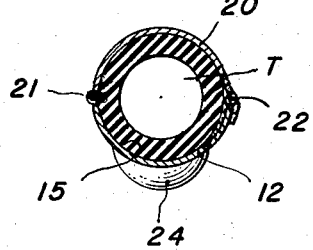
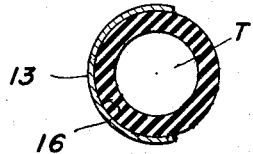
INVENTOR
NILS NORDSTROM Jr.
BY
ATTORNEY Patented Nov. 3, 1953

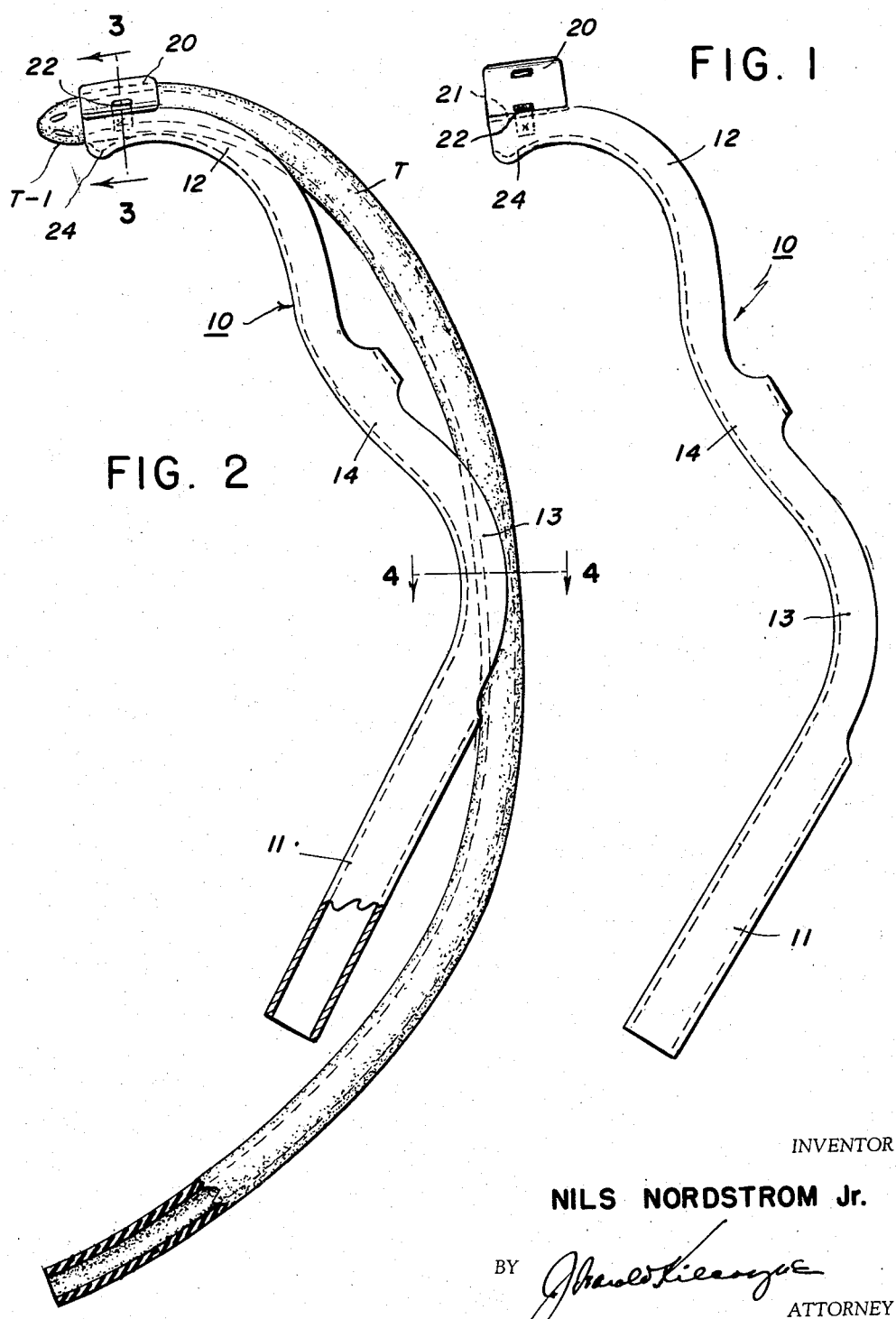

2,657,691

UNITED STATES PATENT OFFICE 2,657,691

INSTRUMENT USEFUL IN ANESTHETIZING BY INTRATRACHEAL INSUFFLATION

Nils Nordstrom, Jr., Binghamton, N. Y.

Application December 1, 1952, Serial No. 323,421

6 Claims. (Cl. 128—303)

1

This invention relates to an instrument useful in anesthetising by intratracheal insufflation, and more particularly to an instrument for facilitating the insertion of an endotracheal or so-called Magill tube into the trachea, usually referred to an intubation, for the purpose of administering anesthesia through the respiratory system or airway.

Heretofore, intubation was possible only with the aid of instruments providing visualization of the tracheal opening by light and the retraction of obstructing tissue, with the actual insertion of the tube into the trachea being a distinct additional procedure. The objections to such methods of intubation are so numerous as to discourage its common usage even though intubation is recognized as providing absolute control over the airway. For example, the prior visualization instruments are sufficiently complex in structure and use as to require specialized technique available only through experts, their use requires prolonged deep anesthesia, they are difficult to use on a heavy-necked muscular individual, and they are likely to produce trauma to tissues and fracture of teeth. Moreover, their use involves a considerable amount of time and skill not always readily available in emergencies, and they require a dry field for best results.

Stated generally, this invention contemplates and provides an instrument which enables intubation to be practiced without any requirement of visualization of the trachael opening (unless such is indicated for other reasons), yet with complete and absolute control of the tube during its insertion into the trachea.

Another important aim of the invention is the provision of an instrument of the stated character, which simplifies and shortens the procedure of inserting an endotracheal tube to a degree that intubation can be practiced by any physician rather than by an expert, as heretofore. The ease and simplicity with which intubation may be effected by an instrument as herein proposed, taken with the fact that the method of intubation made possible by the present invention requires deep anesthesia for only a short period of time, gives the further advantages that intubation may be used on practically any person requiring this type of treatment, and that it can be safely used more often and is consequently life-saving.

Yet another important object of the invention is the provision of an instrument for effecting insertion of an endotracheal tube, without visualization, but nevertheless with complete control of the tube during its insertion, as given by air sounds, namely, the sound of the patient's breathing through the tube.

A further practical object of the invention is the provision of an instrument for facilitating the insertion of an endotracheal tube, which is so constructed and arranged that its proper use results in little or no trauma of the tissues and no likelihood of the teeth of the patient being fractured, as with prior intubation methods requiring the use of instruments depending on visualization.

The above and other objects and advantages of an instrument according to the invention will appear from the following detailed description and accompanying drawings, in which Fig. 1 is a side elevation of an instrument for facilitating insertion of an endotracheal tube according to the invention, the view illustrating the tube securing means in its raised or open position;

Fig. 2 is a view similar to Fig. 1, illustrating a so-called Magill tube fitted into and held by the instrument, ready for insertion;

Fig. 3 is a section taken on line 3—3 of Fig. 2;

Fig. 4 is a section taken on line 4—4 of Fig. 2; and

Fig. 5 is a schematic view showing the manner in which the instrument effects placement of the tip of the tube directly over the tracheal opening.

Referring to the drawings, the instrument proper is preferably of one-piece construction and it is preferably fashioned from an appropriate length of stainless steel tubing bent and opened up to slightly greater than half-tubular section as required, although it may also be fashioned from rod stock bent and machined to the required section, or it may be cast by one of the known casting methods. When fashioned from metallic tubing, the tubing will have internal diameter corresponding to the external diameter of the tube to be inserted, and when made from rod stock or cast, it will have the necessary section as to provide receiving channels for said tube.

As seen in the drawings, the instrument has a working or head portion generally designated 10 and a straight shank portion 11 which functions as a handle, said head and shank portions having an angular disposition of approximately 120°. It is to be understood that this angular relation may vary according to the size of the instrument, it being contemplated that such will be made up in three sizes, i. e., small, medium and large, thus to cover the range of patient size.

The head portion 10 is shaped roughly as a cross bow; that is to say, its ends 12, 13 extend along outwardly convex curvatures and are connected by an intermediate portion 14 shown to have opposite or outward concave curvature, and which for strength may have full tubular section as illustrated. With the handle 11 extending integrally from the adjacent curved end 13 of the bow-shaped head portion, it will be seen that the other of free end 12 of the head portion extends from the handle somewhat as a claw having a blunt point.

By reference to Fig. 5, the curvature of said other or claw end 12 of the head portion 10 is such that it corresponds generally to the posterior curve of a human tongue. The curvature of the curved end 13 of the head portion which connects to the handle may have corresponding curvature for convenience in manufacture. Preferably, the concave intermediate portion 14 of the head is formed with a flatter curve, so as to supply a substantial length dimension to the head portion, and also to enable its under surface to function as a tongue depressor.

Both to fit the tube to be inserted to the instrument and to permit controlled relative sliding movement therebetween, the aforesaid convexly curved end portions 12, 13 have slightly greater than half-tubular section, thus to provide outwardly opening tube-receiving grooves or channels 15, 16 (Figs. 3 and 4). Preferably, said channels are slightly oversize with relation to the full-circular section of the tube fitted therein, whereby the latter, although normally retained in the channels, may slide therein.

Thus, as seen in Figs. 2, 3 and 4, when a Magill or equivalent type tube T is threaded through and seated in said channels 15, 16, it interfits with the instrument throughout spaced length portions of the latter corresponding to the convex end 12, 13 of the head portion. By this arrangement, the over-all section of the interfitted tube and instrument is not substantially greater than the section of the tube T, thus making intubation easier on the patient, and the tube and instrument may be handled as one.

As this point, it will be observed from Fig. 5 that the described arrangement providing for the tube T lying outwardly of or above the instrument proper insures that in use of the instrument the upper front teeth of the patient are protected from contact with the instrument by the intermediate tube. It will also be seen that the length and curvature of the instrument head portion 10 is such as to space the curved end 13 of the head portion a substantial distance forwardly and above the patient's lower teeth. Accordingly, the danger of fracture of the teeth occurring in use of the instrument is reduced to a minimum.

Means are provided for positively securing the tube T to the instrument so that, when the tube is fitted into the instrument as aforesaid, both may be inserted as one. Such means preferably comprises a semi-cylindrical latch member 20 hinged at 21 along its one side edge to the outer edge of the channel 15 provided in the free end or claw part 12 of the head portion. When the latch member 20 is closed and held as by a spring detent 22, it is adapted to provide with said claw part a circular enclosure for the end portion of the tube seating in the channel 15. Usually, the diameter of the tube proper is slightly under that of the tube tip T-1, such resulting in a shoulder between tip and tube proper against which the front end of the latch member 20 engages. Thus, with the latch member closed on the tube, the latter must follow the inserting movement of the instrument, but the tube may be slid forwardly of the instrument as and when desired.

As best seen in Fig. 1, the terminal portion of the free or claw-like end 12 of the head portion 10 is provided with a rounded protrusion 24 projecting from its under side, which functions similarly to a blunt bill of a hook. The purpose of this rounded protrusion will be later described in connection with the manner of using the instrument.

Referring to Figs. 2 and 5, the method of intubation made possible by the instrument of the invention is generally as follows: The patient is anesthetized to a depth which permits relaxation of the mandible. The properly selected Magill or equivalent tube T is lightly lubricated, as is generally done in prior intubation methods, and is fitted into the instrument and latched thereto. When so fitted, the tip end T-1 of the tube should project slightly beyond the latch member 20. The tube portion extending over the handle 11 and said handle are now grasped and held together with one hand by the physician, and the claw end 12 with the secured tip end of the tube are guided into the mouth and thence into the pharynx, with the claw end 12 pointing downwardly as shown. During such inserting movement, it may be necessary to pull the tongue forward slightly. With the tube in the pharynx, the physician now delicately guides the claw end 12 downwardly toward the vocal cords and he is assisted in doing this accurately by the gradually increasing intensity of the sound of the air entering the tube on inspiration and expiration of the patient.

It should be kept in mind that the epiglottis overlying the vocal cords is attached anteriorly, in the fashion of a trap door. Consequently, in guiding the tip end of the tube downwardly toward the vocal cords, attempt should be made to scoop up the epiglottis by approaching it posteriorly and moving the instrument anteriorly or forwardly. In so doing, the protrusion or bill 24 of the free or claw end 12 will automatically elevate the epiglottis without trauma and simultaneously push the tongue forwardly, the intermediate part 14 of the head portion now serving as a tongue depressor.

By virtue of the fact that the tip end T-1 of the tube and claw end 12 of the instrument move as one, the physician, by proper manipulation of the instrument, is enabled to lower said tip end to a position in which it is directly over the vocal cords with a minimum of effort and yet with complete control at all times, the latter being provided by the rigidity of the instrument. When the intensity of the sound of air passing through the tube is at its greatest, the physician will know that said tip T-1 is directly over both the vocal cords and the tracheal opening. When such occurs, he proceeds with his free hand to slide the tube forwardly with respect to the instrument, with assurance that the tip end of the tube will enter the trachea, meaning that intubation has been satisfactorily completed. When every indication exists that the tube has entered the trachea, it is held with the one hand by which it has been slid forwardly and the instrument is withdrawn along the tube with the other hand. Upon emergence of the tube securing or claw end of the instrument, the latch member 20 is raised and the instrument disconnected from the tube.

Without further analysis, it will be appreciated that an instrument according to this invention greatly simplifies and speeds up the operation of inserting an endotracheal tube, as compared to prior methods of intubation. Its manner of use is simple to the degree that, following one or two trials thereof to acquire familiarity with the manner in which it operates, intubation may be practiced by any physician called upon to perform a treatment involving intubation. Its ease of manipulation is moreover such as to minimize anesthesia difficulties, and hence the intubating instrument of the invention makes intubation easier on the patient.

As many changes could be made in carrying out the above constructions without departing from the scope of the invention, it is intended that all matter contained in the above description or shown in the accompanying drawings shall be interpreted as illustrative and not in a limiting sense.

I claim:

1. An instrument for facilitating the insertion of an endotracheal tube into the trachea for anesthetic purposes comprising an elongate tube-holding member having angularly related head and handle portions, the head portion being shaped generally as a cross bow having outwardly convex ends, of which one end merges into the handle portion and the other end projects from the handle portion as a claw, at least said other end of the head portion being provided with a longitudinal channel having part-circular section corresponding to the section of the tube and which opens through its outer convex side for receiving the end portion of a tube to be inserted into the trachea with sliding fit, and means for securing the tube received in said channel immediately adjacent its tip, the construction and arrangement being such that said other end of the head portion and a tube whose tip end is received in said channel may be inserted as one into the pharynx and the tip of the tube guided to a position above the opening to the trachea.

2. An instrument as set forth in claim 1, wherein the claw-like end of the head portion is provided with an external rounded protrusion adapted to be brought behind the epiglottis and to elevate the latter upon forward movement being imparted to the instrument.

3. An instrument as set forth in claim 1, wherein the convex ends of the head portion are connected by an outwardly concave portion, the convex inner side of which functions as a tongue depressor.

4. An instrument as set forth in claim 1, wherein said tube securing means comprises a semi-circular latch member hingedly connected to the terminal portion of the claw-like end of the head portion and adapted to form therewith a full-circular enclosure for the tip end of the tube.

5. An instrument as set forth in claim 1, wherein the said head and handle portions have an angular disposition of approximately 120°.

6. An instrument as set forth in claim 1, wherein said one convex end of the head portion from which said handle portion extends is also provided with a longitudinal tube-receiving channel as aforesaid, said channels being longitudinally aligned and spaced from one another by an intermediate length of said head portion which is outwardly concave and has full circular section.

NILS NORDSTROM, Jr.

No references cited.